Figure 1:
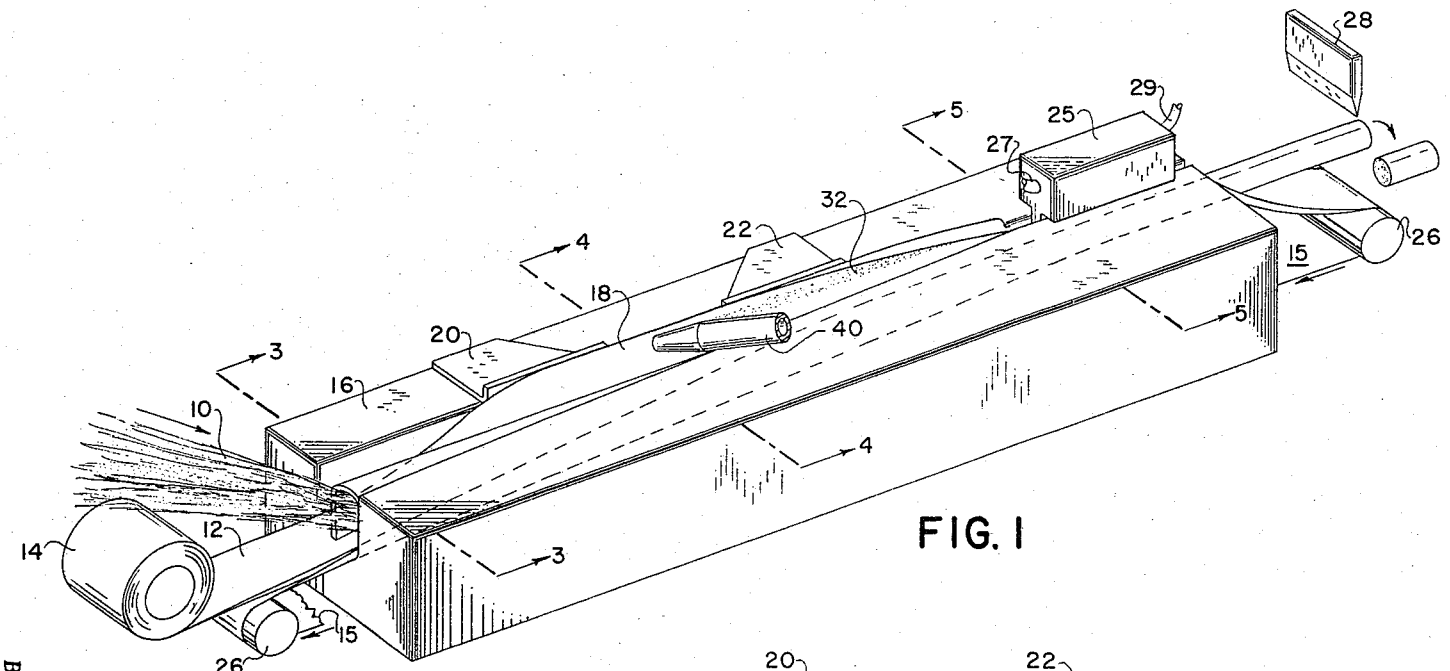
Figure 2:
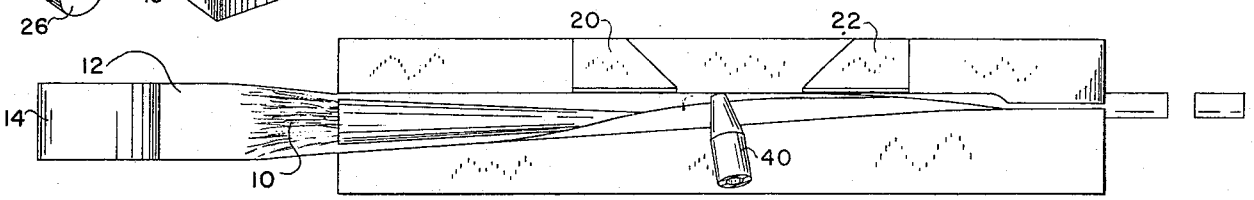

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 21, 1970

873 O.G. 687

T873,010
HOT MELT APPLICATOR AND SEAM COOLING

Charles E. Sandidge, P.O. Box 511,
Kingsport, Tenn. 37662

Filed Mar. 6, 1969, Ser. No. 804,879
Int. Cl. B31b *1/62;* B31c *5/00;* B65b *13/32*
U.S. Cl. 93—1
2 Sheets Drawing. 12 Pages Specification

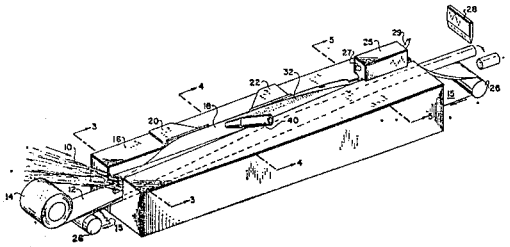

An applicator for providing a strip of hot melt adhesive (32) along a continuously advancing substrate (12) to form a seam. Apparatus is provided having a nozzle (40) which includes an orifice (44) and an edge portion adapted to deposit a bead of hot melt and immediately spread the bead along a tautly supported marginal portion of the continuously advancing (15) substrate. The nozzle has a predetermined angular relation with respect to the substrate to which the strip of hot melt is applied. Marginal portions (18) of the substrate are subsequently brought into overlapping position to form a seam. External cooling means (25) may also be used for quickly solidifying the hot melt.

April 21, 1970 C. E. SANDIDGE T873,010

HOT MELT APPLICATOR AND SEAM COOLING

Filed March 6, 1969 2 Sheets-Sheet 1

CHARLES E. SANDIDGE
*INVENTOR.*

BY John F Stevens

ATTORNEY

HOT MELT APPLICATOR AND SEAM COOLING
Filed March 6, 1969 2 Sheets-Sheet 2
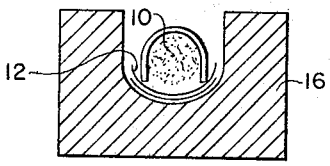
FIG. 3
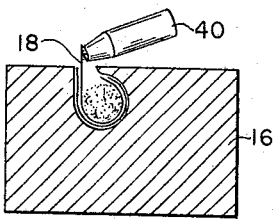
FIG. 4
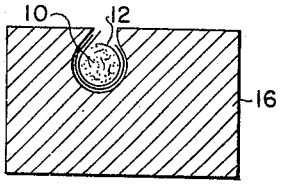
FIG. 5
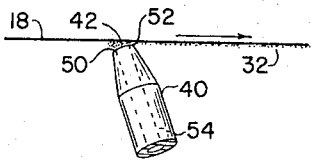
FIG. 7
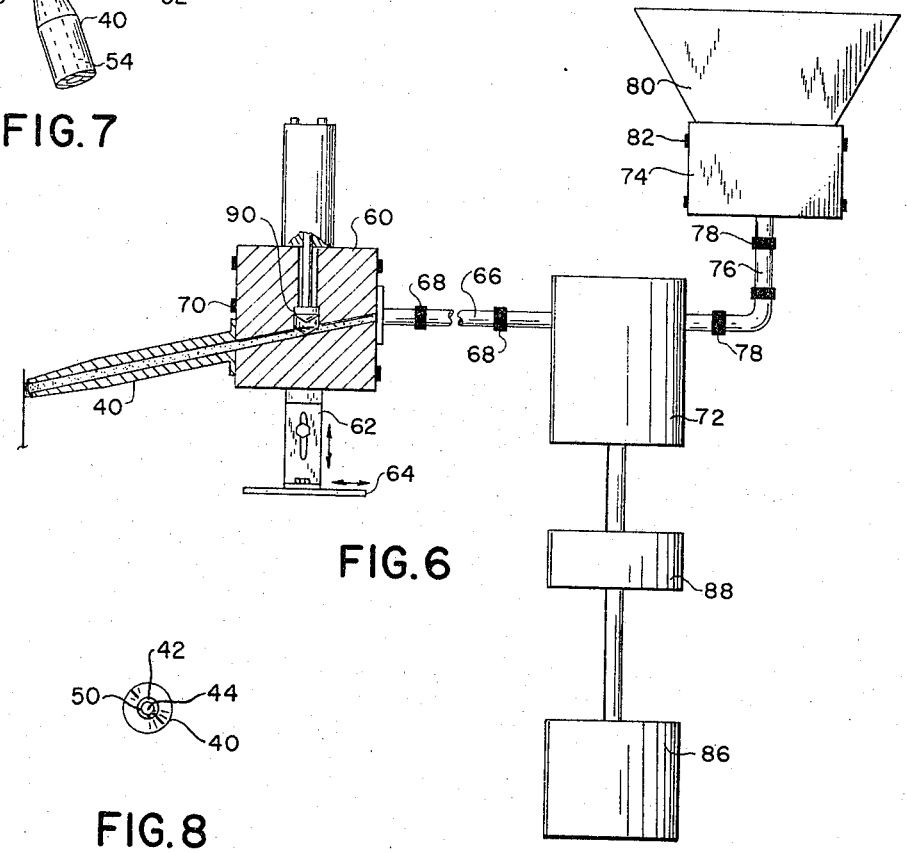
FIG. 6
FIG. 8
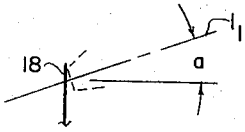
FIG. 9
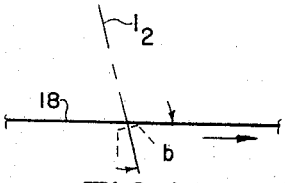
FIG. 10
CHARLES E. SANDIDGE
INVENTOR.
BY John F. Stevens
ATTORNEY